US010347073B2

(12) United States Patent
Amos et al.

(10) Patent No.: US 10,347,073 B2
(45) Date of Patent: Jul. 9, 2019

(54) SYSTEMS AND METHODS FOR THREE DIMENSIONAL GAMES IN GAMING SYSTEMS

(71) Applicant: IGT CANADA SOLUTIONS ULC, Moncton (CA)

(72) Inventors: William George Amos, Moncton (CA); Vicky Leblanc, Moncton (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 1441 days.

(21) Appl. No.: 14/291,685

(22) Filed: May 30, 2014

(65) Prior Publication Data

US 2015/0348360 A1 Dec. 3, 2015

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |
| ***G07F 17/34*** | (2006.01) |

(52) U.S. Cl.

CPC ........ *G07F 17/3213* (2013.01); *G07F 17/326* (2013.01); *G07F 17/3244* (2013.01); *G07F 17/34* (2013.01)

(58) Field of Classification Search

CPC . G07F 17/326; G07F 17/3211; G07F 17/3265
See application file for complete search history.

(56) References Cited

U.S. PATENT DOCUMENTS

| | | | |
|---|---|---|---|
| 6,607,441 | B1 | 8/2003 | Acres |
| 6,846,238 | B2 | 1/2005 | Wells |
| 7,804,995 | B2 | 9/2010 | Lipton et al. |

(Continued)

FOREIGN PATENT DOCUMENTS

| | | | |
|---|---|---|---|
| CA | 2601560 | A1 | 10/2006 |
| CA | 2783122 | A1 | 1/2013 |

(Continued)

OTHER PUBLICATIONS

IP Australia, 1st Examination Report for AU Application No. 2014277734 dated Dec. 15, 2015.

(Continued)

*Primary Examiner* — Milap Shah
*Assistant Examiner* — Jason Pinheiro
(74) *Attorney, Agent, or Firm* — Sage Patent Group

(57) ABSTRACT

An electronic gaming machine, an electronic gaming system, and a computer-implemented method for providing three dimensional selection games in a gaming system are disclosed. The electronic gaming machines includes: at least one processor; at least one persistent data store; at least one receiver to receive game data for storage in the at least one persistent data store; and a display device configured with a user interface to display: 1) a multi-faceted gaming surface comprising at least two gaming surface representations; and 2) a portion of the game data as a first set of 3D game components on one or more of the at least two gaming surface representations in accordance with a set of game rules for a given game, each one of the 3D game components having a symbol associated thereto.

19 Claims, 8 Drawing Sheets

(56) References Cited

U.S. PATENT DOCUMENTS

| | | | |
|---|---|---|---|
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,715,060 | B2 | 5/2014 | Bowron |
| 8,888,589 | B2 * | 11/2014 | Brunet de Courssou .................... G07F 17/3209 463/16 |
| 9,070,259 | B2 * | 6/2015 | Berman .............. G07F 17/3202 |
| 9,773,379 | B2 * | 9/2017 | Hutchinson-Kay .......................... G07F 17/326 |
| 2002/0122585 | A1 | 9/2002 | Swift et al. |
| 2003/0032479 | A1 | 2/2003 | LeMay et al. |
| 2003/0064805 | A1 | 4/2003 | Wells |
| 2004/0218269 | A1 | 11/2004 | Divelbiss et al. |
| 2005/0020278 | A1 | 1/2005 | Krumm et al. |
| 2005/0117637 | A1 | 6/2005 | Routhier et al. |
| 2005/0190180 | A1 | 9/2005 | Jin et al. |
| 2006/0287060 | A1 | 12/2006 | Yoshimi |
| 2007/0296859 | A1 | 12/2007 | Suzuki |
| 2008/0020845 | A1 | 1/2008 | Low et al. |
| 2008/0318684 | A1 | 12/2008 | Rofougaran |
| 2010/0267439 | A1 | 10/2010 | Englman et al. |
| 2010/0298040 | A1 | 11/2010 | Joshi et al. |
| 2011/0032329 | A1 | 2/2011 | Bauza et al. |
| 2011/0045891 | A1 | 2/2011 | Ansari |
| 2011/0298795 | A1 | 12/2011 | Van Der Heijden et al. |
| 2012/0077564 | A1 | 3/2012 | Collette et al. |
| 2012/0115606 | A1 | 5/2012 | Seelig |
| 2012/0122547 | A1 | 5/2012 | Aoki et al. |
| 2012/0165101 | A1 | 6/2012 | Krishnamoorthy et al. |
| 2013/0019024 | A1 | 1/2013 | Sheth et al. |
| 2013/0023325 | A1 * | 1/2013 | Saunders ................ G07F 17/32 463/20 |
| 2013/0093752 | A1 | 4/2013 | Yuan |
| 2013/0178271 | A1 | 7/2013 | Aponte et al. |
| 2013/0184070 | A1 | 7/2013 | Gadher et al. |
| 2013/0184071 | A1 | 7/2013 | Gadher et al. |
| 2014/0087827 | A1 * | 3/2014 | Nicely ................ G07F 17/3267 463/20 |
| 2014/0094268 | A1 | 4/2014 | Adams |
| 2014/0187309 | A1 | 7/2014 | Trainor et al. |
| 2014/0194183 | A1 | 7/2014 | Pierer et al. |

FOREIGN PATENT DOCUMENTS

| | | | |
|---|---|---|---|
| CA | 2783272 | A1 | 1/2013 |
| CA | 2800295 | A1 | 3/2014 |
| CA | 2827465 | A1 | 3/2014 |
| EP | 2551832 | A2 | 1/2013 |
| JP | 2004287057 | A1 | 10/2004 |
| WO | 2008097577 | A1 | 8/2008 |
| WO | 2008116125 | A1 | 9/2008 |
| WO | 2008118800 | A1 | 10/2008 |

OTHER PUBLICATIONS

United States Patent and Trademark Office, Office Action dated Aug. 25, 2014, issued on U.S. Appl. No. 13/631,129.

Patent Cooperation Treaty, Written Opinion and International Search Report dated Oct. 30, 2013, issued on PCT Application No. PCT/CA2013/000636.

United States Patent and Trademark Office, Office Action dated Jun. 20, 2014, issued on U.S. Appl. No. 13/631,129.

* cited by examiner

SYSTEMS AND METHODS FOR THREE DIMENSIONAL GAMES IN GAMING SYSTEMS

TECHNICAL FIELD

Embodiments described herein relate to the field of electronic gaming systems, such as on-line gaming and gaming systems in casinos. In particular, embodiments described herein relate to providing three dimensional games in gaming system.

BACKGROUND OF THE INVENTION

Various video gaming systems or machines are known. These may consist of slot machines, online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. One type of game displays a plurality of moving arrangements of gaming elements (such as reels, and symbols on reels), and one or more winning combinations are displayed using a pattern of gaming elements in an arrangement of cells (or an "array"), where each cell may include a gaming element, and where gaming elements may define winning combinations (or a "winning pattern"). A winning combination may comprise one or more symbols, where each symbol may be a number, an element or another symbol.

Games that are based on winning patterns may be referred to as "pattern games" in this disclosure.

One example of a pattern game is a game that includes spinning reels, where a user wagers on one or more lines, activates the game, and the spinning reels are stopped to show one or more patterns in an array. The game rules may define one or more winning patterns of gaming elements, and these winning patterns may be associated with credits, points or the equivalent.

Another example of a pattern game is a KENO game that is played in and outside of casinos. Traditionally, such a KENO game typically uses a glass container called a "bubble" having 80 balls within. The 80 balls are numbered consecutively through 1 to 80, with each number printed on the ball. Prior to the random draw of balls, players typically mark N (e.g. 20) choices on a piece of paper or ticket with 80 consecutively numbered boxes (from 1-80), and submit the marked ticket as a wager. During a draw, air is pushed into the glass container and the balls are adequately mixed, typically visible to a live audience, and subsequently N (e.g. 20) random balls are drawn from the glass container, forming a winning combinations or winning pattern based on the number printed on each drawn ball. Each player is paid based on the number of matching numbers that are marked on the ticket. Sometimes there may be paytables setting out a pay scale. A KENO game may also be referred to as a selection game throughout this disclosure.

Gaming systems or machines of this type are popular, however, there is a need to compete for the attention of users, and therefore it is necessary to innovate by launching new, engaging game features.

It is to be understood that gaming components and game components are interchangeable terms in this disclosure.

SUMMARY OF THE INVENTION

There are described systems, devices, and methods for providing layered enhancements to game components in a gaming system. In particular, embodiments described herein may provide an electronic gaming machine, an electronic gaming system, and computer-implemented method for enhancing game components in a gaming system using layered three-dimensional enhancements. The three-dimensional enhancements may involve a game with multiple matrices layered in a three-dimensional configuration. The game may integrate gaming components from each matrix to determine winning outcomes.

According to some embodiments of the invention, an electronic gaming machine (EGM) for providing a three-dimensional (3D) selection game is provided, the EGM comprising:

at least one processor;

at least one persistent data store;

at least one receiver to receive game data for storage in the at least one persistent data store; and a display device configured with a user interface to display: 1) a multi-faceted gaming surface comprising at least two gaming surface representations; and 2) a portion of the game data as a first set of 3D game components on one or more of the at least two gaming surface representations in accordance with a set of game rules for a given game, each one of the 3D game components having a symbol associated thereto;

wherein the processor is configured to:

- receive signals indicating a selected set of 3D game components based on the first set of 3D game components;
- display the selected set of 3D game components;
- determine a winning combination comprising one or more winning symbols; and
- display one or more winning 3D game components that correspond to the one or more winning symbols.

According to some embodiments of the invention, the processor is further configured to determine a winning outcome or prize based on the one or more winning 3D game components that correspond to the one or more winning symbols.

According to some embodiments of the invention, the processor is configured to display the selected set of 3D game components in a distinguishing manner which visually distinguishes the selected set of 3D game components from the first set of 3D game components.

According to some embodiments of the invention, the processor is configured to display the selected set of 3D game components in a distinguishing manner by:

- determining a first set of visual characteristics associated with the first set of 3D game components;
- retrieving, from the persistent data store, a set of display rules;
- determining, based on the set of display rules, a second set of visual characteristics; and
- displaying the selected set of 3D game components in accordance with the second set of visual characteristics.

According to some embodiments of the invention, the first or second set of visual characteristics may comprise one or more of: shape, colour, depth level, spatial frequency, blackness level, brightness level, dynamic range, transfer function, duty cycle, and color gamut.

According to some embodiments of the invention, the visual characteristics are displayed in an autostereoscopic manner.

According to some embodiments of the invention, the distinguishing manner comprises displaying the selected 3D game component(s) closer to or further away along a Z axis from a screen of the electronic gaming machine.

According to some embodiments of the invention, the processor is further configured to generate and display a new game as a result of the one or more winning 3D game components that correspond to the one or more winning symbols.

According to some embodiments of the invention, the display device is configured with the user interface to display the 3D game components in a three-dimensional sphere configuration.

According to some embodiments of the invention, the display device is further configured to display the selected set of 3D game components as continuously moving along a X, Y or Z axis.

According to some embodiments of the invention, an electronic gaming system for providing 3D selection game is provided, the system comprising:

- a server comprising a transmitter for transmitting electronic data signals representing game data;
- an electronic device comprising:
  - at least one processor;
  - at least one persistent data store;
  - at least one receiver to receive the electronic data signals representing game data for storage in the at least one persistent data store; and
  - a display device configured with a user interface to display: 1) a multi-faceted gaming surface comprising at least two gaming surface representations; and 2) a portion of the game data as a first set of 3D game components on one or more of the at least two gaming surface representations in accordance with a set of game rules for a given game, each one of the 3D game components having a symbol associated thereto;
- wherein the processor is configured to:
  - receive signals indicating a selected set of 3D game components based on the first set of 3D game components;
  - display the selected set of 3D game components;
  - determine a winning combination comprising one or more winning symbols; and
- display one or more winning 3D game components that correspond to the one or more winning symbols.

According to some embodiments of the invention, the electronic device is an a electronic gaming terminal and wherein the system further comprises:

- a mobile gaming device operated by a player coupled via a communications link to the electronic gaming terminal, the mobile gaming device running a remote gaming program to play the game, the electronic gaming terminal programmed to carry out at least the game functions of pseudo-randomly determining a game outcome and determining an award to a player, and receiving player control signals from the mobile gaming device to initiate the game;
- wherein the electronic gaming terminal is configured to transmit electronic data signals to the mobile gaming device identifying the game outcome and the award.

According to some embodiments of the invention, the processor is further configured to determine the game outcome based on the one or more winning 3D game components that correspond to the one or more winning symbols.

According to some embodiments of the invention, the processor is configured to display the selected set of 3D game components on the mobile gaming device in a distinguishing manner which visually distinguishes the selected set of 3D game components from the first set of 3D game components.

According to some embodiments of the invention, the processor is configured to display the selected set of 3D game components in a distinguishing manner by:

- determining a first set of visual characteristics associated with the first set of 3D game components;
- retrieving, from the persistent data store, a set of display rules;
- determining, based on the set of display rules, a second set of visual characteristics; and
- displaying the selected set of 3D game components in accordance with the second set of visual characteristics.

According to some embodiments of the invention, the first or second set of visual characteristics comprise one or more of: shape, colour, depth level, spatial frequency, blackness level, brightness level, dynamic range, transfer function, duty cycle, and color gamut.

According to some embodiments of the invention, the visual characteristics are displayed in an autostereoscopic manner.

According to some embodiments of the invention, the distinguishing manner comprises displaying the selected 3D game component(s) closer to or further away along a Z axis from a screen of the mobile gaming device.

According to some embodiments of the invention, the processor is further configured to generate and display, on a screen of the mobile gaming device, a new game as a result of the one or more winning 3D game components that correspond to the one or more winning symbols.

According to some embodiments of the invention, the processor is configured with the user interface to display the 3D game components in a three-dimensional sphere configuration on a screen of the mobile gaming device.

According to some embodiments of the invention, the processor is further configured to display the selected set of 3D game components as continuously moving along a X, Y or Z axis on a screen of the mobile gaming device.

According to some embodiments of the invention, a computer-implemented method for providing 3D selection game components is provided, the method comprising:

- receiving, by a processor, game data for storage in at least one persistent data store;
- displaying, using a display device: 1) a multi-faceted gaming surface comprising at least two gaming surface representations; and 2) a portion of the game data as a first set of 3D game components on one or more of the at least two gaming surface representations in accordance with a set of game rules for a given game, each one of the 3D game components having a symbol associated thereto;
- receiving signals, by the processor, indicating a selected set of 3D game components based on the first set of 3D game components;
- displaying, using a display device, the selected set of 3D game components;
- determining, by the processor, a winning combination comprising one or more winning symbols; and
- displaying, using a display device, one or more winning 3D game components that correspond to the one or more winning symbols.

According to some embodiments of the invention, the method further comprises determining a winning outcome or prize based on the one or more winning 3D game components that correspond to the one or more winning symbols.

According to some embodiments of the invention, the method further comprises displaying the selected set of 3D game components in a distinguishing manner which visually distinguishes the selected set of 3D game components from the first set of 3D game components.

According to some embodiments of the invention, displaying the selected set of 3D game components in a distinguishing manner comprises:

determining a first set of visual characteristics associated with the first set of 3D game components;

retrieving, from the persistent data store, a set of display rules;

determining, based on the set of display rules, a second set of visual characteristics; and displaying the selected set of 3D game components in accordance with the second set of visual characteristics.

According to some embodiments of the invention, the first or second set of visual characteristics comprise one or more of: shape, colour, depth level, spatial frequency, blackness level, brightness level, dynamic range, transfer function, duty cycle, and color gamut.

According to some embodiments of the invention, the visual characteristics are displayed in an autostereoscopic manner.

According to some embodiments of the invention, the distinguishing manner comprises displaying the selected 3D game component(s) closer to or further away along a Z axis from a screen of the electronic gaming machine.

According to some embodiments of the invention, the method further comprises generating and displaying a new game as a result of the one or more winning 3D game components that correspond to the one or more winning symbols.

According to some embodiments of the invention, the display device is further configured to display the selected set of 3D game components as continuously moving along a X, Y or Z axis.

According to some embodiments of the invention, an electronic gaming machine (EMG) for providing a 3D selection game is provided, the EGM comprises:

at least one processor;

at least one persistent data store;

at least one receiver to receive game data for storage in the at least one persistent data store; and a display device configured with a user interface to display: 1) a multi-faceted gaming surface comprising at least two gaming surface representations; and 2) a portion of the game data as an initial set of 3D game components on the at least two gaming surface representations of a multi-faceted gaming surface in accordance with a set of game rules for a given game, each one of the 3D game components having a symbol associated thereto;

wherein the processor is configured to:

receive signals indicating at least two selected sets of 3D game components based on the initial set of 3D game components, each respective selected set of the at least two selected sets of 3D game components located on a respective one of the at least two gaming surface representations of the multi-faceted gaming surface;

display the at least two selected sets of 3D game components;

for each of the at least two gaming surface representations, determine a winning combination comprising one or more winning symbols; and display one or more winning 3D game components that correspond to the one or more winning symbols.

According to some embodiments of the invention, each of the at least two gaming surface representations of the multi-faceted gaming surface comprises at least two selection games and the processor is further configured to determine a winning combination for each of the at least two selection games of each of the at least two gaming surface representations.

According to some embodiments of the invention, the multi-faceted gaming surface comprises at least four gaming surface representations, and each gaming surface representation comprises a face of the multi-faceted gaming surface.

According to some embodiments of the invention, the at least two selection games on each of the at least two gaming surface representations is played based on the initial set of 3D game components and the at least two selected sets of 3D game components.

According to some embodiments of the invention, the processor is further configured to determine a winning outcome or prize based on the one or more winning 3D game components that correspond to the one or more winning symbols.

According to some embodiments of the invention, the processor is configured to display the at least two selected sets of 3D game components in a distinguishing manner which visually distinguishes the at least two selected sets of 3D game components from the initial set of 3D game components.

According to some embodiments of the invention, the processor is configured to display the at least two selected sets of 3D game components in a distinguishing manner by:

determining a first set of visual characteristics associated with the initial set of 3D game components;

retrieving, from the persistent data store, a set of display rules;

determining, based on the set of display rules, a second set of visual characteristics; and displaying the at least two selected sets of 3D game components in accordance with the second set of visual characteristics.

According to some embodiments of the invention, the first or second set of visual characteristics comprise one or more of: shape, colour, depth level, spatial frequency, blackness level, brightness level, dynamic range, transfer function, duty cycle, and color gamut.

According to some embodiments of the invention, the processor is further configured to generate and display a new game as a result of the one or more winning 3D game components that correspond to the one or more winning symbols.

According to some embodiments of the invention, the signals indicating the at least two selected sets of 3D game components comprise at least one of user-input signals and machine-input signals.

According to some embodiments of the invention, an electronic gaming system for providing 3D selection game is provided, the system comprising:

a server comprising a transmitter for transmitting electronic data signals representing game data;

an electronic device comprising:

at least one processor;

at least one persistent data store;

at least one receiver to receive the electronic data signals representing game data for storage in the at least one persistent data store; and a display device configured with a user interface to display: 1) a multi-faceted gaming surface comprising at least two gaming surface representations; and 2) a portion of the game data as an initial set of 3D game components on the at least two gaming surface representations of a multi-faceted gaming surface in accordance with a set of game rules for a given game, each one of the 3D game components having a symbol associated thereto;

wherein the processor is configured to:

receive signals indicating at least two selected sets of 3D game components based on the initial set of 3D game components, each respective selected set of the at least two selected sets of 3D game components located on a respective one of the at least two gaming surface representations of the multi-faceted gaming surface;

display the at least two selected sets of 3D game components;

for each of the at least two gaming surface representations, determine a winning combination comprising one or more winning symbols; and display one or more winning 3D game components that correspond to the one or more winning symbols.

According to some embodiments of the invention, each of the at least two gaming surface representations of the multi-faceted gaming surface comprises at least two selection games and the processor is further configured to determine a winning combination for each of the at least two selection games of each of the at least two gaming surface representations.

According to some embodiments of the invention, the multi-faceted gaming surface comprises at least four gaming surface representations, and each gaming surface representation comprises a face of the multi-faceted gaming surface.

According to some embodiments of the invention, the at least two selection games on each of the at least two gaming surface representations is played based on the initial set of 3D game components and at least one of the at least two selected sets of 3D game components.

According to some embodiments of the invention, the processor is configured to display the at least two selected sets of 3D game components in a distinguishing manner which visually distinguishes the at least two selected sets of 3D game components from the initial set of 3D game components.

According to some embodiments of the invention, the processor is configured to display the at least two selected sets of 3D game components in a distinguishing manner by:

determining a first set of visual characteristics associated with the initial set of 3D game components;

retrieving, from the persistent data store, a set of display rules;

determining, based on the set of display rules, a second set of visual characteristics; and displaying the at least two selected sets of 3D game components in accordance with the second set of visual characteristics.

According to some embodiments of the invention, a computer-implemented method for providing 3D selection game components is provided, the method comprising:

receiving, by a processor, game data for storage in at least one persistent data store;

displaying, using a display device: 1) a multi-faceted gaming surface comprising at least two gaming surface representations; and 2) a portion of the game data as an initial set of 3D game components on the at least two gaming surface representations of a multi-faceted gaming surface in accordance with a set of game rules for a given game, each one of the 3D game components having a symbol associated thereto;

receiving signals, by the processor, indicating at least two selected sets of 3D game components based on the initial set of 3D game components, each respective selected set of the at least two selected sets of 3D game components located on a respective one of the at least two gaming surface representations of the multi-faceted gaming surface;

displaying, using a display device, the at least two selected sets of 3D game components;

determining for each of the at least two gaming surface representations, by the processor, a winning combination comprising one or more winning symbols; and displaying, using a display device, one or more winning 3D game components that correspond to the one or more winning symbols.

According to some embodiments of the invention, each of the at least two gaming surface representations of the multi-faceted gaming surface comprises at least two selection games and the processor is further configured to determine a winning combination for each of the at least two selection games of each of the at least two gaming surface representations.

According to some embodiments of the invention, the multi-faceted gaming surface comprises at least four gaming surface representations, and each gaming surface representation comprises a face of the multi-faceted gaming surface.

According to some embodiments of the invention, the at least two selection games on each of the at least two gaming surface representations is played based on the initial set of 3D game components and at least one of the at least two selected sets of 3D game components.

According to some embodiments of the invention, the method further displays the at least two selected sets of 3D game components in a distinguishing manner which visually distinguishes the at least two selected sets of 3D game components from the initial set of 3D game components.

According to some embodiments of the invention, displaying the at least two selected sets of 3D game components in a distinguishing manner comprises:

determining a first set of visual characteristics associated with the initial set of 3D game components;

retrieving, from the persistent data store, a set of display rules;

determining, based on the set of display rules, a second set of visual characteristics; and displaying the at least two selected sets of 3D game components in accordance with the second set of visual characteristics.

Features of the systems, devices, and methods described herein may be used in various combinations, and may also be used for the system and computer-readable storage medium in various combinations.

In this specification, the term "game component" or game element is intended to mean any individual element which when grouped with other elements will form a layout for a game. For example, in a spinning reel game, each reel may be made up of one or more game components. Each game component may be represented by a symbol of a given image, number, shape, color, theme, etc. Like symbols are of a same image, number, shape, color, theme, etc. Other embodiments for game components will be readily understood by those skilled in the art.

BRIEF DESCRIPTION OF THE DRAWINGS

Further features and advantages of embodiments described herein may become apparent from the following detailed description, taken in combination with the appended drawings, in which.

It will be noted that throughout the figures, like features are identified by like reference numerals.

DETAILED DESCRIPTION

Figure 1:
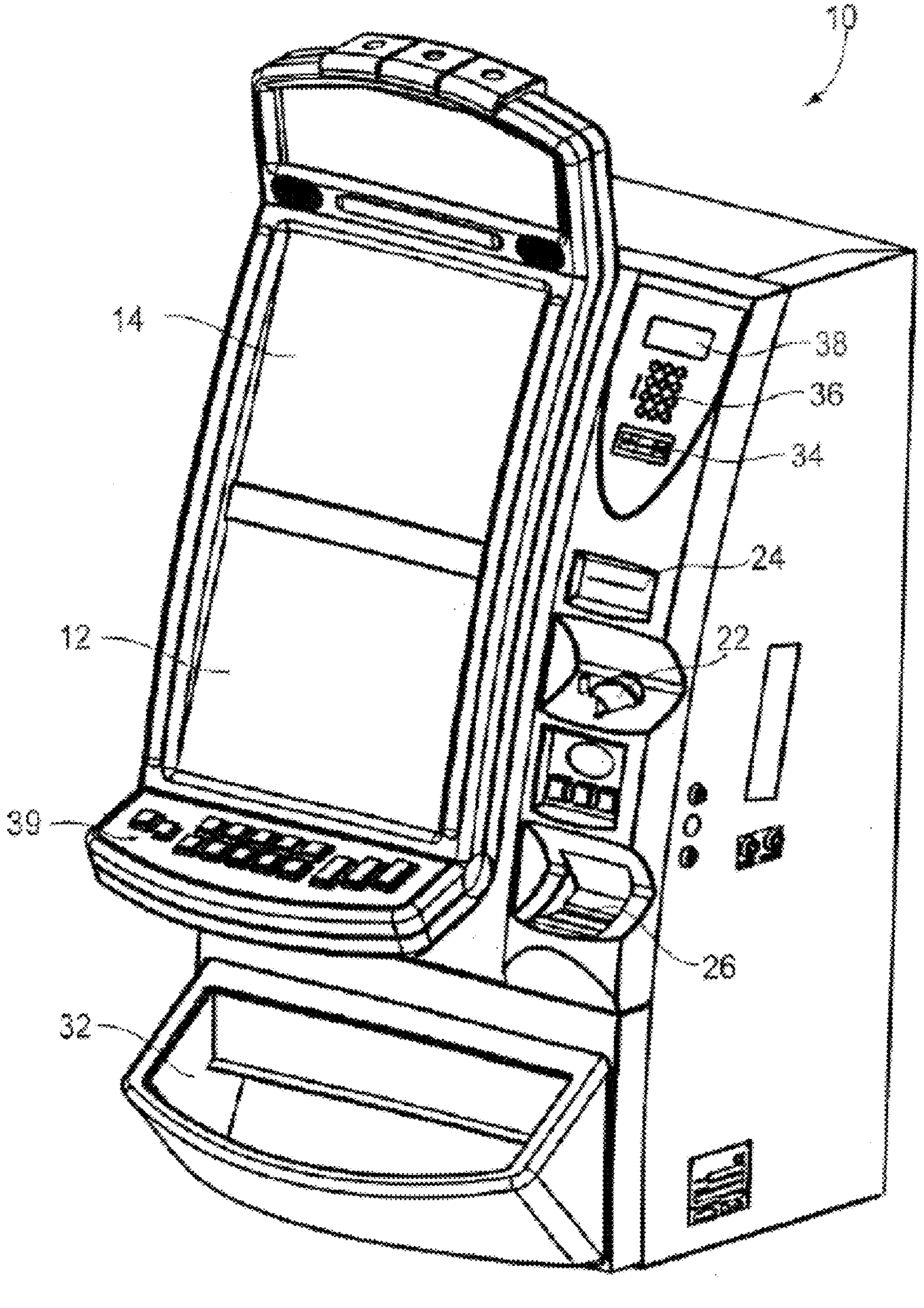
FIG. 1 is a perspective view of an electronic gaming machine for implementing the gaming enhancements, according to some embodiments.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, gaming machine, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data using receivers, transmit data using transmitters, and transform electronic data signals for various three dimensional enhancements using particularly configured processors, where the three dimensional enhancements are for subsequent display on three dimensional adapted display screens.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The gaming enhancements described herein may be carried out using any type of computer, including portable devices, such as smart phones, that can access a gaming site or a portal (which may access a plurality of gaming sites) via the internet or other communication path (e.g., a LAN or WAN). Embodiments described herein can also be carried out using an electronic gaming machine (EGM) in various venues, such as a casino. One example type of EGM is described with respect to FIG. 1.

FIG. 1 is a perspective view of an EGM 10 where the three-dimensional enhancements to game components may be provided. EGM 10 includes a display 12 that may be a thin film transistor (TFT) display, a liquid crystal display (LCD), a cathode ray tube (CRT), auto stereoscopic three dimensional display. and LED display, an OLED display, or any other type of display. A second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12/14 may also include a camera.

Display 12 or 14 may have a touch screen lamination that includes a transparent grid of conductors. Touching the screen may change the capacitance between the conductors, and thereby the X-Y location of the touch may be determined. The processor associates this X-Y location with a function to be performed. Such touch screens may be used for slot machines. There may be an upper and lower multi-touch screen in accordance with some embodiments.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the gaming machine 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. The card reader reads the inserted card for player and credit information for cashless gaming. The card reader may read a magnetic code on a conventional player tracking card, where the code uniquely identifies the player to the host system. The code is cross-referenced by the host system to any data related to the player, and such data may affect the games offered to the player by the gaming terminal. The card reader may also include an optical reader and printer for reading and printing coded barcodes and other information on a paper ticket. A card may also include credentials that enable the host system to access one or more accounts associated with a user. The account may be debited based on wagers by a user and credited based on a win. Alternatively, an electronic device may couple (wired or wireless) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

Player control buttons 39 may include any buttons or other controllers needed for the play of the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

The EGM 10 may also include hardware configured to provide optical motion tracking. The optical motion tracking may include a body and head controller.

As described herein, EGM 10 may be configured to provide three dimensional enhancements to game components. The three dimensional enhancements may be provided dynamically as dynamic game content in response to electronic data signals relating to player input, game activity, player interactivity with display and EGM 10, and so on. the EGM 10 may include a display with multi-touch and auto stereoscopic three-dimensional functionality, including a camera, for example. The EGM 10 may also include several effects and frame lights. The three dimensional enhancements may be three dimensional variants of gaming components. For example, the three dimensional variants may not be limited to a three dimensional version of the gaming components.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also couple to a user's mobile device to provide a tethering gaming experience. That is, EGM 10 may be configured to establish a communications link between a mobile gaming device operated by a player and EGM 10. The mobile gaming device may run a remote gaming program to play games via EGM 10, and the EGM 10 may be programmed to carry out at game functions of pseudo-randomly determining a game outcome and determining an award to a player. The EGM 10 may receive player control signals from the mobile gaming device to initiate a game. The EGM 10 may carry out the game, including determining a final outcome of the game and any award for the outcome. The EGM 10 may transmit signals to the mobile gaming device identifying the final outcome of the first game and the award. In this configuration, a player may play games provided by the EGM 10 remotely using their mobile gaming device.

That is, a wireless hand-held device, such as a tablet, may be used to remotely play EGM 10. The EGM 10, for security and central monitoring/accounting purposes, may perform all the processing to deduct a bet from the remote player's stored bank of credits, randomly select a game outcome, determine the award to be paid to the player, and credit the player's bank of credits. The information processed by EMG 10 may be wirelessly communicated to the tablet, and the predetermined outcome may be displayed to the player (such as by displaying stopped reels). The tablet may function as a user interface and display.

The EGM 10 may also include a camera. The camera may be used for motion tracking of player, such as detecting player positions and movements, and generating signals defining x, y and z coordinates. A viewing object of the game may be illustrated as a three-dimensional enhancement coming towards the player. Another viewing object of the game may be illustrated as a three-dimensional enhancement moving away from the player. The players head position may be used as a view guide for the viewing camera during a three-dimensional enhancement. A player sitting directly in front of display 12 may see a different view than a player moving aside. The camera may also be used to detect occupancy of the machine.

The EGM 10 may also include a digital button panel. The digital button panel may include various elements such as for example, a touch display, animated buttons, frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The EGM 10 may also include physical buttons.

The EGM 10 may include frame and effect lights. The lights may be synchronized with enhancements of the game. The EGM 10 may be configured to control color and brightness of lights. Additional custom animations (color cycle, blinking, etc.) may also be configured by the EGM 10. The customer animations may be triggered by certain gaming events.

FIG. **2*a* is a block diagram of EGM 10 linked to the casino's host system 41. The EGM 10 may use conventional hardware. FIG. 2*b* illustrates a possible online implementation of a computer system and online gaming device in accordance with the present gaming enhancements. For example, a server computer 34 may be configured to enable online gaming in accordance with embodiments described herein. One or more users may use a computing device 30 that is configured to connect to the Internet 32 (or other network), and via the Internet 32 to the server computer 34** in order to access the functionality described in this disclosure.

A communications board 42 may contain conventional circuitry for coupling the EGM 10 to a local area network (LAN) or other type of network using any suitable protocol, such as the G2S protocols. Internet protocols are typically used for such communication under the G2S standard, incorporated herein by reference. The communications board 42 transmits using a wireless transmitter, or it may be directly connected to a network running throughout the casino floor. The communications board 42 basically sets up a communication link with a master controller and buffers data between the network and the game controller board 44. The communications board 42 may also communicate with a network server, such as in accordance with the G2S standard, for exchanging information to carry out embodiments described herein.

The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen).

The game controller board 44 also controls one or more devices that produce the game output including audio and video output associated with a particular game that is presented to the user. For example audio board 51 converts coded signals into analog signals for driving speakers. A display controller 52, which typically requires a high data transfer rate, converts coded signals to pixel signals for the display 53. Display controller 52 and audio board 51 may be directly connected to parallel ports on the game controller board 44. The electronics on the various boards may be combined onto a single board.

Computing device 30 may be particularly configured with hardware and software to interact with gaming machine 10 or gaming server 34 via network 32 to implement gaming functionality and render three dimensional enhancements, as described herein. For simplicity only one computing device 30 is shown but system may include one or more computing devices 30 operable by users to access remote network resources. Computing device 30 may be implemented using one or more processors and one or more data storage devices configured with database(s) or file system(s), or using multiple devices or groups of storage devices distributed over a wide geographic area and connected via a network (which may be referred to as "cloud computing").

Computing device 30 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. As described herein, a computing device 30 may couple to EGM 10 to remotely play games via EGM 10. Further, in some configurations computing device 30 may operate as EGM 10, or components thereof.

Computing device 30 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 30 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device 30 may include one or more input devices, such as a keyboard, mouse, camera, touch screen, sensors, and a microphone, and may also include one or more output devices such as a display screen (with three dimensional capabilities) and a speaker. Computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Computing device 30 is operable to register and authenticate users (using a login, unique identifier, and password for example) prior to providing access to applications, a local network, network resources, other networks and network security devices. Computing device 30 may serve one user or multiple users.

Although not shown, computing device 30 may comprise displays 12, 14 as well to display various game components to one or more users. A computing device 30 may couple to EGM 10 to remotely play games via EGM 10. Further, in some configurations computing device 30 may operate as EGM 10, or components thereof.

Figure 2A:
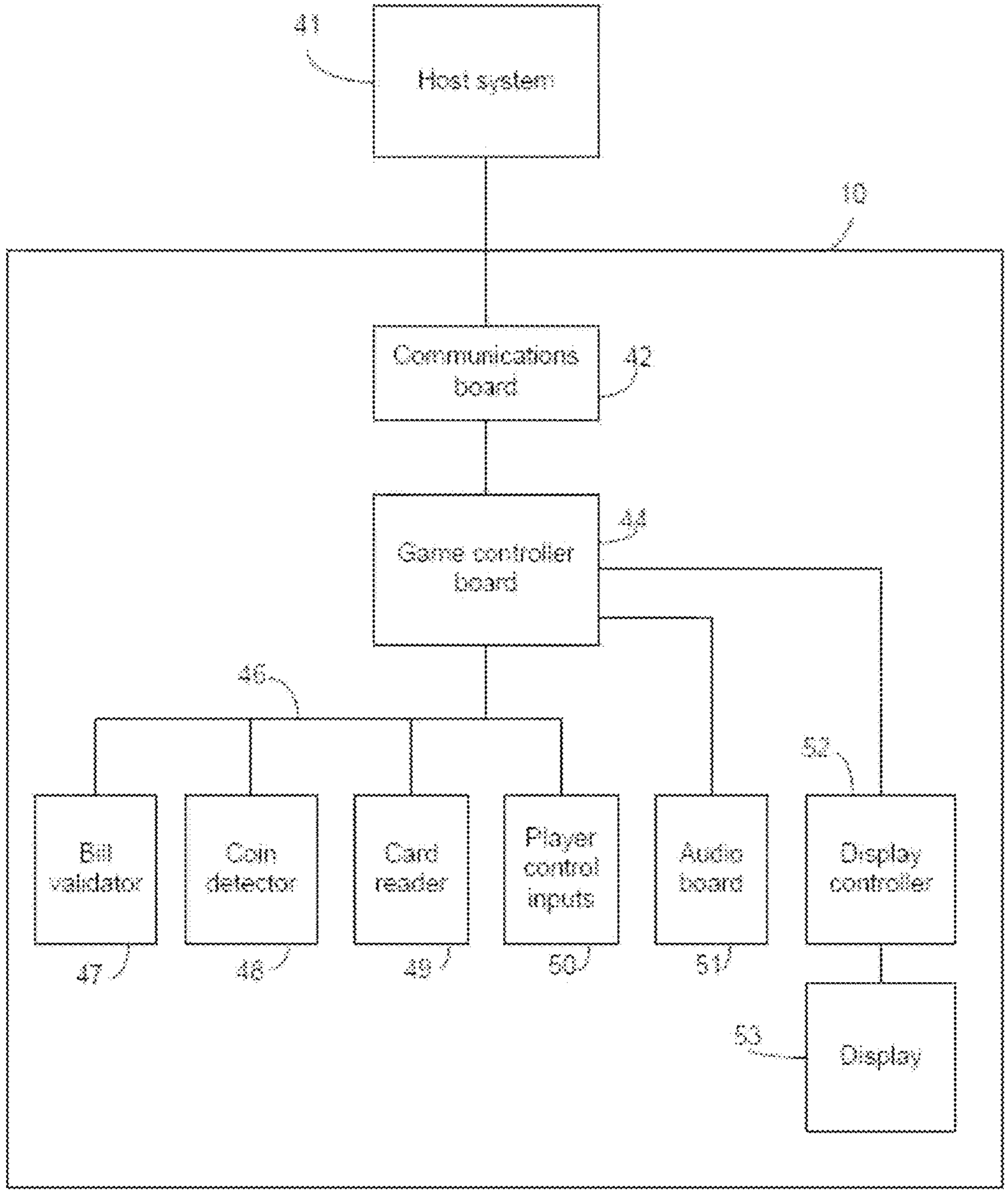
FIG. 2*a* is a block diagram of an electronic gaming machine linked to a casino host system, according to some embodiments.
Figure 2B:
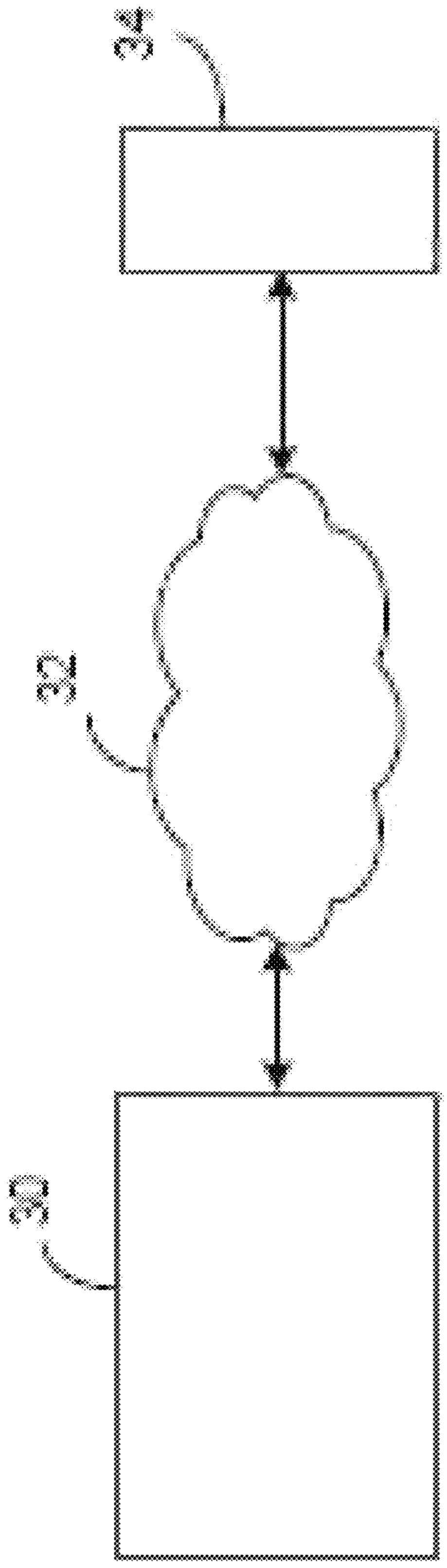
FIG. 2*b* is an exemplary online implementation of a computer system and online gaming system.
Figure 3:
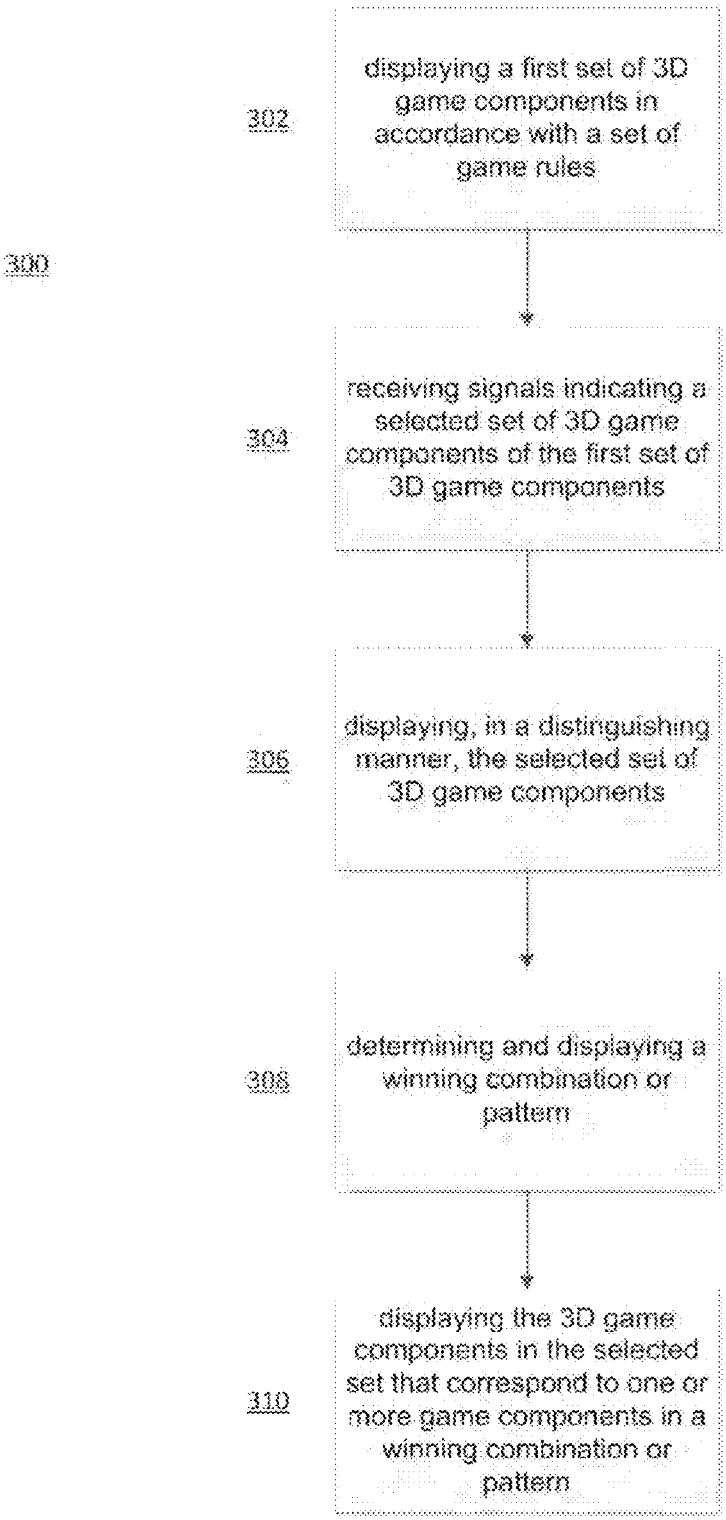
FIG. 3 is a flowchart illustrating an exemplary embodiment for a computer-implemented method for providing a three dimensional game in a gaming system.

FIG. 3 is a flowchart illustrating an exemplary embodiment for a computer-implemented method for providing a three dimensional game in a gaming system such as that illustrated in FIGS. 1, 2*a*, and 2*b*.

In one embodiment of the invention, at 302, EGM 10 can cause a display device 12, 14 to display game data as a first set of three dimensional (3D) game components in a 3D setting or environment, in accordance with a set of game rules for a given game. As shown in FIGS. 4, 5, 6*a* and 6*b*, the 3D game components may be uniformly sized balls 410, 510 in a KENO game, or uniformly sized cubes or other elements in a bigger multi-faceted gaming surface or cube 600, 610. The first set of 3D game components (e.g. cubes or balls numbered from 1 to 49) as set by EGM 10 can serve as a set of game components from which the player can choose to form selected set(s) of game components.

In some embodiments, each of the game component in the first set of 3D game components may be printed with a numeric value, consecutively numbered from 1 to N, where N is the total number of the first set of 3D game components. In some other embodiments, each of the game component in the first set of 3D game components may be printed with a symbol from a predetermined set of N symbols.

The display device 12, 14 may display the 3D game components in a three-dimensional configuration. That is, display device 12, 14 may display a three-dimensional enhancement by expanding a first axis X and second axis Y in a third dimensional axis Z. The 3D configuration results in a different display of electronic data signals to illustrate the game components three-dimensionally.

At 304, EGM 10 can receive electronic signals from input means such as player control inputs 50 indicating a number of player's selections of 3D game components that are from the first set of 3D game components. The total number of 3D game components selected by the player may be predetermined to be a certain threshold or fixed value, such as 20 or 30 for example.

At 306, based on the selected set of 3D game components from the player, EGM 10 can further cause displays 12, 14 to show the selected set of 3D game components in a distinguishing manner such that the selected set of 3D game components stand out to the player against the rest of the (unselected) game components in the background. In one embodiment, the selected 3D game components may be pushed further to the screen along a Z axis, so that the player can perceive the selected 3D game components as being closer to himself.

There can be a variety of ways or methods to display the selected set of 3D game components in a distinguishing manner. For example, one or more 3D game components in the first set of the 3D game components may be displayed by displays 12, 14 with a first set of visual characteristics such as shape, colour, depth level, spatial frequency, blackness level, brightness level, dynamic range, transfer function, duty cycle, color gamut, and so on. There may be stored in a persistent data store a set of display rules for determining one or more additional sets of visual characteristics that can differentiate or distinguish the selected set of 3D game components, when displayed with the additional set of visual characteristics, from the first set of 3D game components shown with the first set of visual characteristics.

Such visual characteristics may be achieved in an autostereoscopic manner in that no headgear or glasses on the part of the player is required. For example, lenticular lens, parallax barrier, volumetric display, holographic and light field displays may be used.

In another embodiment of the invention, such visual characteristics may be achieved with the aids of headgear or glasses on the part of the player.

In one embodiment of the invention, the set of display rules may vary from game to game, or from 3D game component to 3D game component. For example, the display rules may be such that once a 3D game component is selected, it should be displayed more with a 3D halo effect. In another example, the display rules may be such that the first five or ten selected 3D game components are moved to an area that is front and centre in the displays 12, 14. In yet another example, the display rules may be such that all of the selected 3D game components are pushed towards a screen of displays 12, 14 along an invisible Z axis, but that each of the selected 3D game component occupies a different position along the Z axis.

Digital image processing algorithms or techniques such as compression, image analysis, tomographic reconstruction, pattern recognition, feature extraction and so on may be utilized in displaying the first or selected set of 3D game components in accordance with the first or additional set of visual characteristics.

At 308, EGM 10 is operable to determine, at random, a winning combination or pattern involving a series of elements, symbols or numbers from the first set of 3D game components. The number of winning elements, symbols or numbers in a winning pattern may vary from game to game. In one embodiments, the number of winning elements, symbols or numbers can correspond to the number of game components in the selected set of 3D game components in step 304.

At 310, EGM 10 is configured to determine matched game components or winning 3D game component in a selected set of the 3D game components that correspond to (or match) the one or more elements, symbols or numbers in the winning combination, and to further display the matched 3D game components in the selected set in a distinguishing manner. In another embodiment, EGM 10 can be configured to display all winning 3D game components, including the ones from the first or initial set of the 3D game components, that correspond to the one or more symbols in the winning combination.

Optionally, EGM 10 can further determine a prize associated with the matched 3D game components and award the player accordingly.

Figure 4:
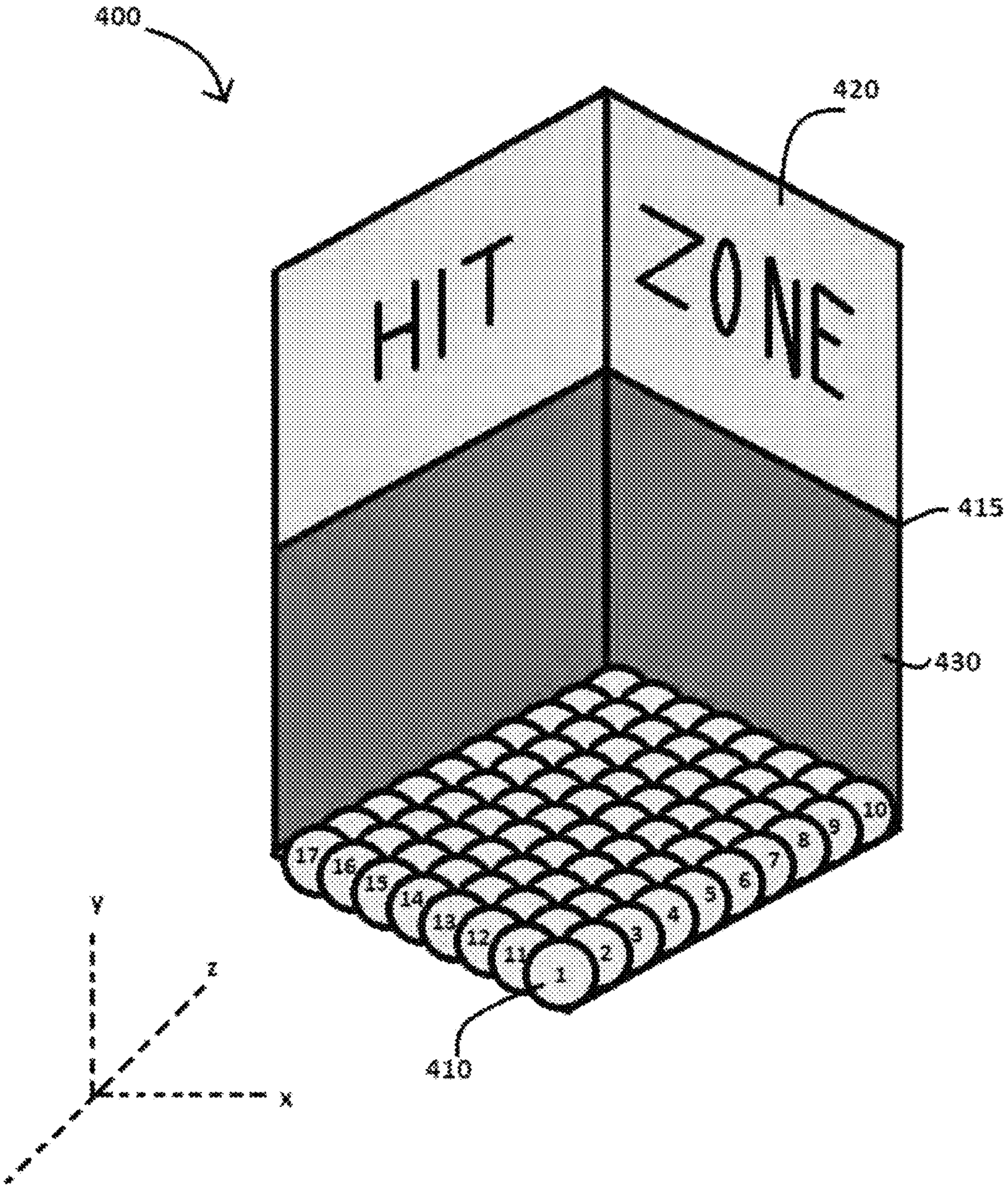
FIG. 4 is an exemplary embodiment of a three dimensional KENO game at a rest position according to some embodiments.

FIG. 4 is an exemplary embodiment of a three dimensional KENO game 400 at a rest position according to some embodiments.

As shown, a total of eighty (80) numbered balls (i.e., a first set of 3D game elements 410) are visible on an invisible X-Y-Z grid. For example, if there are 80 3D game components in the first set, then each may be numbered with a value in a consecutive set {1, 2, 3 . . . 80}, without duplicating any of the numbers in the set. Each printed number, element or symbol on each 3D game component may be referred to as a symbol associated with the 3D game component throughout this disclosure.

The total number of 3D game components may vary from game to game and is not limited to 80 (e.g. it may be 70 or 90). As described above, a player can select one or more 3D game components (balls) from the first set, in accordance with a predetermined threshold (e.g. can select 10, 20 or 30 out of 80 balls), and then hit the start button, at which time some or all the balls 410 can begin bouncing on the invisible vertical Y axis, for example each at a different frequency or speed. The player can press stop at any time, at which time all the balls or 3D game components can freeze or "hang" in a froze position. At the froze position, any balls which are above a predetermined height threshold 415, are in a hit zone 420 and thus considered "hits" or "matches"; any balls that are below the height threshold 415 are in a non-hit-zone 430 and are considered misses.

EGM 10 can then be configured to determine a winning pattern based on the hits or matches in the hit zone 420 in accordance with a set of game rules. For example, all the hits or matches may become part of a winning combination or pattern.

In another embodiment, once the player hits the start button, some or all of the balls 410 can begin moving in a random direction at a different frequency or speed. At all times, the player can visually keep track of the selected set of game components as the selected set of game component continue to be displayed in a distinguishing manner that is different from the non-selected 3D game components. For example, the selected set of game components may be displayed in a different colour, or may be in a different shape (e.g. cubes instead of balls).

In yet another embodiment, the height threshold 415 may be adjusted from game to game, or even during a game as the balls are bouncing.

Figure 5:
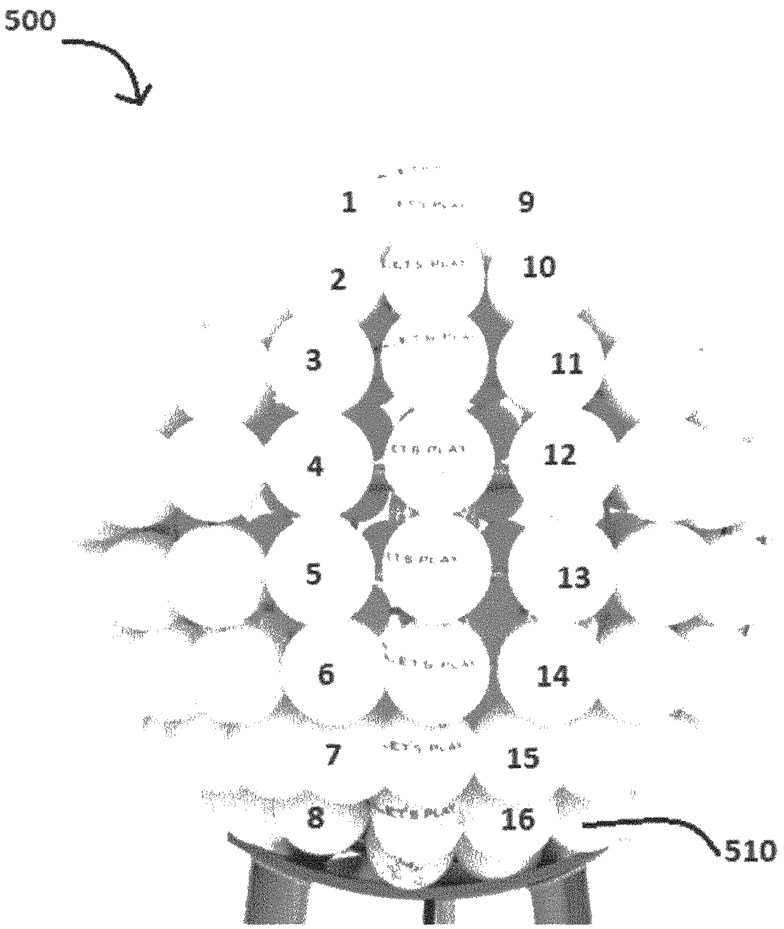
FIG. 5 is another exemplary embodiment of a three dimensional KENO game according to some embodiments.

Referring now to FIG. 5, which is another exemplary embodiment of a three dimensional KENO game according to some embodiments.

As shown in FIG. 5, a KENO grid comprising a plurality of first set of balls or 3D game components in a three dimensional sphere is shown by display 12, 14. Each of the 3D game components 510 may be numbered and printed with a corresponding number accordingly. For example, if there are 100 3D game components in the first set, then each may be numbered with a value in a consecutive set {1, 2, 3 . . . 100}, without duplicating any of the numbers in the set.

A player may, using input control 50 or swiping motions, rotate the 3D sphere in any desired direction to view the numbers printed on the balls or 3D game elements. The player may further make selections of 3D game components in the first set via any suitable means. The player may choose up to a predetermined number of selected set of 3D game components (e.g. 10, 20 or 30, up to the total number of the first set of 3D game components).

Referring back to step 306, the displays 12, 14 may display the selected set of 3D game components in an distinguishing manner, such as displaying them in a different colour, and/or pushing the selected 3D game components further away from the centre of the 3D sphere and thus more prominently displayed than the unselected 3D game components.

The EGM 10 can determine, at random, a winning combination or pattern via a computer-implemented draw. Each winning combination may comprise a plurality of numbers, symbols or elements, or a mix of two or more of numbers, symbols or elements. With each drawn number or symbol, the EGM 10 can be configured to determine if there is any match between a selected 3D game component and the drawn number or symbol, and if there is, the EGM 100 may cause displays 12, 14 to "pull" the matched 3D game component further away from the center of the 3D sphere, thereby pushing the matched 3D game component closer to the screen or player when the 3D sphere rotates the matched 3D game component into view. In contrast, any missed selected 3D game component can be pushed towards the center of the 3D sphere, which can appear to be vanishing out of sight.

Alternatively or concurrently, the selected 3D game components may be manipulated to change shape if and when matched with a drawn number or symbol.

Lastly, a prize may be awarded to the player based on the matched 3D game components.

It is worth noting that even though the 3D game component 510 in this embodiment are shown to take the shape of a ball, it may also be of any other shape such as a cube, a pyramid, and so on.

Referring now to FIGS. *6a* and *6b*, which show another example of three dimensional KENO game with multi-faceted gaming surfaces. As described below, FIGS. *6a* and *6b* also illustrate an example of providing multiple games on multi-faceted gaming surfaces to be played simultaneously.

The gaming surface may be shown as a three-dimensional game enhancement in this example. That is, the three-dimensional game enhancement may be a multi-faceted gaming surface. FIG. *6a* shows two different gaming surface representations 602, 604, each being a facet or "face" of a cube-shaped multi-faceted gaming surface 600, 610. The cube-shaped multi-faceted gaming surface 600, 610 may rotate or spin (either by default or by user control) to reveal more of a particular gaming surface representation 602, 604 or different gaming surfaces that may currently be hidden from view. For example, the second illustration of multi-faceted cube 600 on the right in FIG. *6a* shows more of one gaming surface 604.

FIG. *6b* also shows two different gaming surfaces 606, 608 on each visible facet of a multi-faceted gaming surface. The multi-faceted gaming surface may rotate or spin to reveal more of a particular gaming surface representation 606, 608 or different gaming surface representations that may currently be hidden from view. For example, the second illustration of multi-faceted cube 610 on the right in FIG. *6b* shows more of one gaming surface representation 608. A cube is an illustrative example and different shapes and configurations may be used for the multi-faceted gaming surface.

3D Multi-Game Mode

Figure 6A:
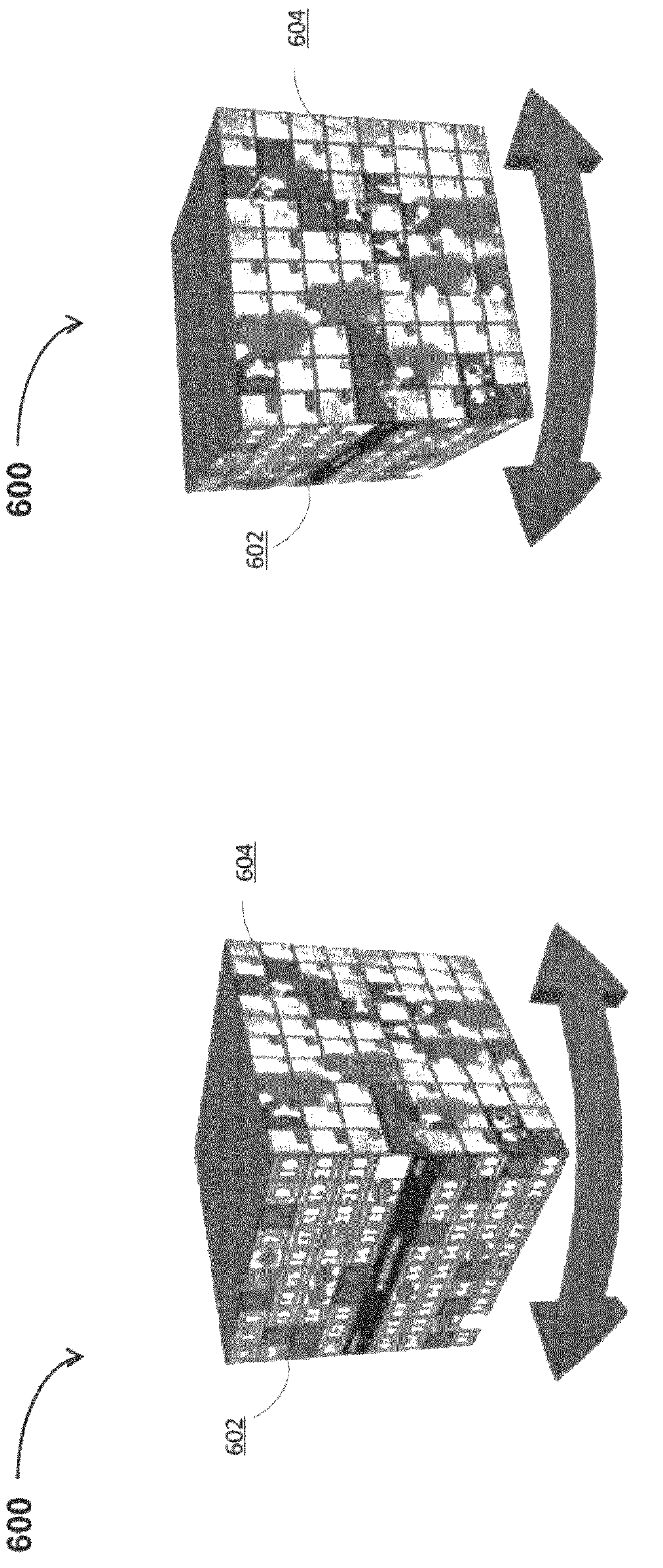
FIGS. 6*a* and 6*b* show another example three dimensional KENO game with multi-faceted gaming surfaces.
Figure 6B:
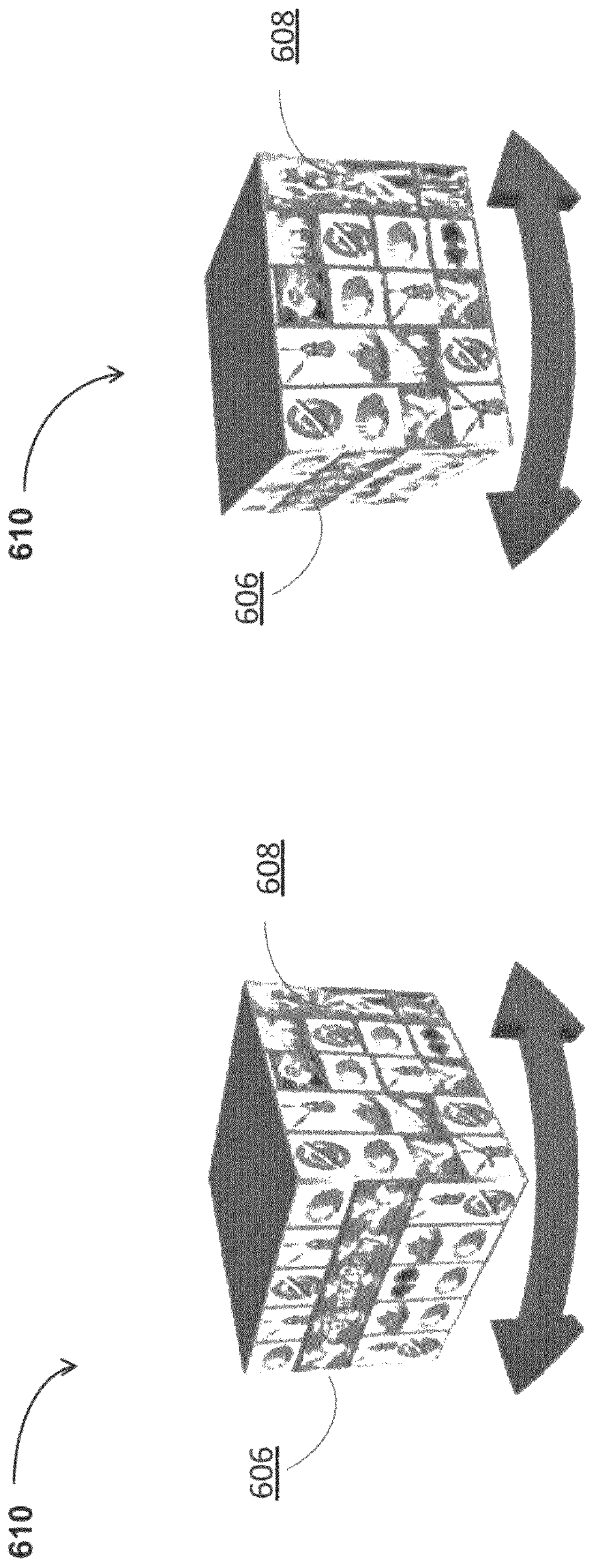

The respective faces of the multi-faceted game surface may correspond to respective gaming surface representations, with at least one selection game on each respective gaming surface representation. The games may be different games of the same or different game type(s). For example, any four-card KENO selection game, or multi-play game where the player is playing two or more games at once may be displayed on each respective gaming surface representation of a cube-shaped multi-faceted gaming surface, instead of beside each other, to enhance 3D effects, to maximize space and to pique player interests. For example, as shown in FIGS. 6*a* and 6*b*, a cube-shaped multi-faceted gaming surface 600, 610 may each contain at least four gaming surface representations 602, 604, 606, 608. Each of the four gaming surface representations may constitute a KENO game or a selection game. The player is thus able to play at least four games simultaneously or near simultaneously, with each respective game on a respective gaming surface representation 602, 604, 606, 608 of the cube-shaped multi-faceted gaming surface 600, 610. The player may swipe the cube, via touching the display or via a button on the gaming machine, in any direction to change the gaming surface and thus the game card. In another example, buttons on screen may be selected to bypass the swipe control, but the rotation may still be displayed on the surface of a cube.

In one embodiment of the invention, EGM 10 may cause a display device 12, 14 to display game data as an initial set of three-dimensional (3D) game components in a 3D setting or environment, in accordance with a set of game rules for a given game. As shown in FIGS. 6*a* and 6*b*, the 3D game components may be uniformly sized cubes or other elements in a bigger multi-faceted gaming surface or cube 600, 610. The initial set of 3D game components (e.g. cubes or balls numbered from 1 to 100) can serve as a set of game components from which the player can choose to form selected set(s) of game components. There may be an initial set of 3D game components for all selections games available on the multi-faceted gaming surface, or alternatively, there may be an initial set of 3D game components for each of the selection games available on the multi-faceted gaming surface.

A player can start playing multiple games on a cube-shaped multi-faceted gaming surface 600, 610 by making selections of a first selected set of 3D game components based on the initial set per the game rules, as described above, on a first gaming surface representation of the cube-shaped multi-faceted gaming surface 600, 610. The total number of 3D game components selected by the player may be predetermined to be a certain threshold or fixed value, such as 20 or 30 for example. The total number of 3D game components selected may also be limited by the number of game components on the first surface of the cube-shaped multi-faceted gaming surface 600, 610.

The player may proceed to pick a second selected set of 3D game components on a second gaming surface representation of the multi-faceted gaming surface. Optionally the player may cause the EGM 10 to swipe the multi-faceted gaming surface 600, 610 so that a gaming surface representation on which the player intends to play may be turned more fully into view. The player may do this via a touch screen, a hand gesture in the air, or a control button or control means on the EGM 10.

The player may, at his or her option, further make or pick a third and/or fourth selected set of 3D game components based on the initial set of game components displayed on the screen. Similarly to the first two selected sets, the third (and fourth if applicable) selected set of 3D game components can each be on a different gaming surface representation of the multi-faceted game surface. In the event that the player chooses not to pick a second, third or fourth selected set of 3D game components, the EGM 10 may be instructed by a set of pre-determined machine-input instructions to pick the rest of the selected set(s) of 3D game components, as to enable simultaneously playing of all available games on all gaming surface representations of the multi-faceted gaming surface. The machine-input instructions may pick the game components in a random manner; concurrently or alternatively, the machine-input instructions may pick the game components per a default setting that may be set by system administrator. For example, a player may only pick two selected sets of 3D game components on a first and second gaming surface representations, and let EGM 10 pick the other two selected sets of 3D game components on the third and fourth gaming surface representations.

Together the first, second, third . . . (and so on) selected sets of the 3D game components may be referred to as the at least two selected sets of 3D game components, whether picked by the player or machine instructions.

Based on the at least two or more selected sets of 3D game components from the player, EGM 10 can further cause displays 12, 14 to show the at least two or more selected sets of 3D game components in a distinguishing manner such that the at least two or more selected sets of 3D game components visually stand out to the player against the rest of the (unselected) game components in the background.

There can be a variety of ways or methods to display the at least two or more selected sets of 3D game components in a distinguishing manner. For example, one or more 3D game components in the initial set of the 3D game components may be displayed by displays 12, 14 with a first set of visual characteristics such as shape, colour, depth level, spatial frequency, blackness level, brightness level, dynamic range, transfer function, duty cycle, color gamut, and so on. There may be stored in a persistent data store a set of display rules for determining one or more additional sets of visual characteristics that can differentiate or distinguish the at least two selected sets of 3D game components, when displayed with the additional set of visual characteristics, from the initial set of 3D game components shown with the first set of visual characteristics.

Such visual characteristics may be achieved in an autostereoscopic manner in that no headgear or glasses on the part of the player is required. For example, lenticular lens, parallax barrier, volumetric display, holographic and light field displays may be used.

In another embodiment of the invention, such visual characteristics may be achieved with the aids of headgear or glasses on the part of the player.

In one embodiment of the invention, the set of display rules may vary from game to game, or from a first selected set of 3D game component to a second selected set of 3D game component in the at least two selected set(s) of game components. For example, the display rules may be such that once a 3D game component is selected, it should be displayed more with a 3D halo effect. In another example, the display rules may be such that the first five or ten selected 3D game components are moved to an area that is front and centre in the displays 12, 14. In yet another example, the display rules may be such that all of the selected 3D game components are pushed towards a screen of displays 12, 14 along an invisible Z axis, but that each of the selected 3D game component occupies a different position along the Z axis.

Digital image processing algorithms or techniques such as compression, image analysis, tomographic reconstruction, pattern recognition, feature extraction and so on may be utilized in displaying the first or selected set of 3D game components in accordance with the first or additional set of visual characteristics.

Next, EGM 10 is operable to determine, for each selection game on each gaming surface representation of the multi-faceted gaming surface, at random, a winning combination or pattern involving a series of elements, symbols or numbers from the initial set of 3D game components. The number of winning elements, symbols or numbers in a winning pattern may vary from game to game. In one embodiment, the number of winning elements, symbols or numbers can correspond to the number of game components in each of the at least wto selected set(s) of 3D game components.

Consequently, EGM 10 can be configured to determine matched game components or winning 3D game components, in one or more of the at least two selected sets of the 3D game components, that correspond to (or match) the one or more elements, symbols or numbers in the winning combination, and to further display the winning 3D game components in the selected sets in a distinguishing manner. In another embodiment, EGM 10 can be configured to display all winning 3D game components, including those from the initial set of the 3D game components but are not in the at least two selected sets of 3D game components, that correspond to the one or more symbols in the winning combination.

Optionally, EGM 10 can further determine a prize associated with the matched or winning 3D game components and award the player accordingly.

In another embodiment of the invention, each of the gaming surface representations may comprise two or more selection games (e.g., four games on each gaming surface representation). For instance, for a cube-shaped multi-faceted gaming surface with four gaming surface representations, each gaming surface representation comprising four selection games each, there may be a total of 16 games available for simultaneous playing or near-simultaneous playing.

Similar to the case where only one selection game is available on each gaming surface representation, the player may, via touch screen, hand gesture, or control buttons on the EGM 10, cause the multi-faceted gaming surface to rotate, spin or otherwise move so that different sides or faces of the multi-faceted gaming surface can turn into view. In addition, the player may pick selected 3D game components as he or she sees fit, up to a certain threshold of total number of selected 3D game components per selection game per gaming surface representation. In the event the player leaves any selected set of 3D game components unfulfilled or the number of selected 3D game components is under the threshold of total number of selected 3D game components per game, the EGM10 can send machine-input instructions to automatically pick the rest of the selected 3D game components, across different games and if necessarily across different gaming surface representations, in order to fulfill all the selected sets of 3D game components for each of the games on the multi-faceted gaming surface.

In another embodiment of the invention, there may be different numbers of games on each respective gaming surface representations of a multi-faceted gaming surface. For example, a first gaming surface representation may contain two games, while a second gaming surface representation may contain three games, and a third gaming surface representation may contain just one game. The number of games may be pre-determined by games rules or it may be altered by system administrator or any other suitable means.

In another embodiment of the invention, the 3D multi-faceted surface of the KENO game as illustrated in FIGS. **6*a* and 6*b*** can cause and enable selected 3D game components (e.g. selected smaller cubes) to change shape and/or spin in its position in the bigger cube. Moreover, if and when any player-selected 3D game components is matched with a drawn number or symbol, the matched 3D game component may further be zoomed in (i.e., enlarged with respect to the rest of the game components) and morph into a multi-faceted KENO game itself. Optionally, a bonus round may be offered when a special 3D game component has been drawn and matched.

In accordance with some embodiments, a game component on a matrix layered behind a top matrix (or embedded therein) may have a three-dimensional structure. Instead of a reel spin, the action event may be a rotation of the three-dimensional structure to reveal a game symbol. That is, a game component on a matrix may be a multi-facet gaming component. Additional symbols may be provided on one or more of the facets of the three-dimensional structure. The additional symbols may be used in various ways. For example, in a spinning reel game, as each game component is spun in a single direction, such as about the x axis, the multi-facet gaming component may be spun about multiple axes, such as the y axis and/or the x axis, thus resulting in more possibilities for the spinning gaming component. Alternatively, various events in the game, such as a particular winning combination or reaching a threshold of points, may activate the trigger symbol and allow the player to freely rotate the multi-faceted gaming component in a desired direction, such that the symbol on the facet that is rotated to the front may be used for a winning combination. The symbols on the facets other than the front may be displayed to the player or hidden from view. Various events in the game may allow hidden facets to be selectively shown to the player. Other scenarios are also possible. While the multi-faceted three-dimensional structure in this example can be a cube, other geometrical shapes are also possible, such as a cylinder, an octagon, and many others.

In accordance with embodiments described herein, a game component may be an enhanced three-dimensional multi-faceted game component. The multi-faceted game components may be arranged in a three-dimensional configuration. Each multi-faceted game component may be associated with a gaming symbol. The gaming symbol may be identifiable, visible and displayed on multiple faces of each multi-faceted game component. When the multi-faceted game components are arranged in a three-dimensional configuration one or more of the faces may be covered by other game components or hidden from a particular view or angle, while one or more of the faces may still be visible at the particular view or angle. The game symbol for each multi-faceted game component may still be identifiable as it may still be shown on the visible face(s). Three-dimensional enhancements may involve rotations of multi-faceted game components and gaming surfaces on multiple axes rotation.

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

While illustrated in the block diagrams as groups of discrete components communicating with each other via distinct electrical data signal connections, the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching example embodiments. The hardware components are configured to provide practical applications of innovative computerized gaming features. The hardware components are configured to provide physical transformations by, for example, transforming the display on gaming screen with three dimensional enhancements.

The concept of enhanced game components may be applied to game mechanics in multiple ways. For example, Wild cards may be placed one on top of each other to create a depth showing multiple wilds in one spot resulting in awarding of the same line multiple times. Wilds may have a multiplier attached to each of the layers in the depth, for example, the front one is worth 1×, the second level is worth 2×, the third level is worth 3×, etc. Surrounding Wilds may be used by offering a layer above a regular reel set that would allow for wilds to be created when reels stop (i.e. any symbol landing would have the opportunity to become wild). This allows for depth to the surrounding wilds. For games that may have a match functionality, it would allow for chunks of wilds and symbols to pay. In some embodiments, Wilds may stay in place until it is awarded. This would allow for the wild to grow in size allowing for either: multiplier attached to the wild; additional wilds stacking up and growing on the spot; or physically growing outwards on the Z axis onscreen.

Scatters may be used in a stacked configuration as well. Scatters may be placed on top of each other to create a depth showing multiple scatters in one spot, resulting in an award for a collective number of scatters. Scatters may also have a multiplier attached to each of the layers in the depth, for example, the front one is worth 1×, the second level is worth 2×, the third level is worth 3×, etc.

The third dimension provided by the enhanced game components may act as a portal or hole into the game (e.g. base game, secondary game, bonus game), given access to a bonus round or an additional win category. Symbols may appear with multiple layers and players may collect symbols and place them one on top of another in a single space. Three-dimensional stacks may be formed by allowing for symbols to be stacked not just on the vertical but also in the third (z) axis, allowing for depth to the normally viewed stacked symbol.

The game component enhancements allow for chunks of symbols that are spanning the vertical space of the reel to also have a back expansion area that causes a ‘block’ effect. It allows for chunks of symbols that are spanning the horizontal space of the reel to also have a back expansion area that causes a ‘block’ effect. It may also allow for depth on certain reels to create a new pattern of the physical game grid dimension.

Triggers may be modified using the game component enhancements. Such triggers may include, for example, consecutive triggers (on or outside of a reel), scatter, and trigger tiles. Triggers may lead to various events, such as additional credits, additional payouts, secondary games, bonus rounds, etc. Trigger tiles may be placed on any reel shape/dimension as desired, as a triggering mechanism. Multiple layers could be applied to this triggering mechanism as well. Pay ways may also be modified, as the enhancements allow for multiple games to be played in the same space. Shapes of lines wins may be collected to create a full screen pattern of extra prizes. Different layers with different line sets may be played all at once.

The game enhancements may be applied to multiple environments, such as KENO, 3D game grids, Player User Interfaces (PUI), Greenball (as described in U.S. application Ser. No. 13/631,129, the contents of which are hereby incorporated by reference), and many others. For KENO, multiple balls may be placed on a same number. One screen may be provided with layered effects. For 3D game grids, a ‘cube’ effect may be created, where the player can interact with the cube to ‘spin’ it to reveal an additional bonus prize. The enhancement offers a position to expand outwards to create a multiple symbol container. It also offers multi-levels, different matrices, games that become available during bonus rounds as special features activate the exterior, or multiple games to be wagered upon. Multi-facet game boards (i.e. with a matrix on different angles) are also possible.

Bonus types may also be enhanced via the game component enhancements. For example, multiple free games may be played in a layered style. This allows for symbols that land one in front of another that match to create some sort of super win/super symbol that spans in depth and possibly in height, if synchronized reels are used. In a picking screen for picking a prize, the player may grab and drag the 3D object and reposition it on the screen. Progressive posts may get physically larger and expand outwards to show the player that they are getting closer to being awarded, and/or larger in value.

The user interfaces, computer implemented methods, and computer system components described may be used in connection with a variety of different games that are pattern games or that include pattern game components.

Various functions or features described in this disclosure may be implemented as part of different gaming systems. For example:

(A) The winning enhancements may be implemented as part of a game to system (G2S) system.

(B) As previously stated, the user interfaces, computer implemented methods, and computer system components described herein may be used by an EGM.

(C) In the event the game is a lottery game, the game computer may be an in-store gaming system or a gaming kiosk. For lottery games including the enhancements to the game components, the host system may be controlled by a government agency.

As described herein, a third dimension may be provided by the enhanced game components. Three dimensional enhancements may be provided as a primary game (or base game), secondary game or a bonus game in some embodiments. Motion tracking data for the player received via camera may be used to update and modify the three dimensional enhancements, for example. Head and body movements of the player may control aspects of the game.

In some example embodiments, the number of bonus choices may be proportional to the size of the bet, or average bet. The number of features may also be proportional to the size of the bet, or average bet.

Three dimensional enhancements may be provided as dynamic content, where bonus selection and other gaming features may display differently from one trigger to the next. The three dimensional enhancements provide variety in primary and bonus game types to appeal to a broad player demographic.

A bonus game may include progressive levels and may be of a different game type than the primary game, including new symbols and rules. There may also be hidden features within the game.

The game may be a tile based game where different lines shapes of corresponding tiles may be associated with different winning amounts for the game.

Three dimensional enhancements may be used for various game features. For example, there may be a three dimensional enhancement for a trigger symbol, a base game, a tension spin, a large or medium win, a bonus game, a bonus game choice entry, help functionality, introduction to game, and so on.

An example flow for a game with three dimensional enhancements may include a base game with bonus or hidden features. There may be a trigger within the base game to launch a bonus selection game level where the player can select a bonus game from multiple choices. There may be a short description for each bonus game. The amount of bet or average bet within the base game may be proportional to the number of bonus game choices. For example, a higher bet may increase the number of bonus games to select from. The bonus games may be different types of games. The base game may also be a different type of game.

The game may be played on a standalone video gaming machine, a gaming console, on a general purpose computer connected to the Internet, on a smart phone, or using any other type of gaming device. The video gaming system may include multiplayer gaming features.

The game may be played on a social media platform, such as Facebook™. The video gaming computer system may also connect to a one or more social media platforms, for example to include social features. For example, the video gaming computer system may enable the posting of results as part of social feeds (e.g. posting to Twitter™). In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game interface to the player.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, changes and modifications may be made.

The invention claimed is:

1. An electronic gaming machine for providing a 3D selection game comprising:

at least one processor;

at least one persistent data store;

at least one receiver to receive game data for storage in the at least one persistent data store; and a display device configured with a user interface to display: 1) a multi-faceted gaming surface comprising at least two gaming surface representations; and 2) a portion of the game data as an initial set of 3D game components on the at least two gaming surface representations of the multi-faceted gaming surface in accordance with a set of game rules for a given game, each one of the 3D game components having a symbol associated thereto;

wherein the processor is configured to:

receive signals indicating at least two selected sets of 3D game components based on the initial set of 3D game components, each respective selected set of the at least two selected sets of 3D game components located on a respective one of the at least two gaming surface representations of the multi-faceted gaming surface;

display the at least two selected sets of 3D game components;

for each of the at least two gaming surface representations, determine a winning combination comprising one or more winning symbols; and display one or more winning 3D game components that correspond to the one or more winning symbols, wherein each of the at least two gaming surface representations of the multi-faceted gaming surface comprises at least two selection games and the processor is further configured to determine a winning combination for each of the at least two selection games of each of the at least two gaming surface representations.

2. The electronic gaming machine of claim 1, wherein the multi-faceted gaming surface comprises at least four gaming surface representations, and each gaming surface representation comprises a face of the multi-faceted gaming surface.

3. The electronic gaming machine of claim 1, wherein the at least two selection games on each of the at least two gaming surface representations is played based on the initial set of 3D game components and the at least two selected sets of 3D game components.

4. The electronic gaming machine of claim 3, wherein the processor is further configured to determine a winning outcome or prize based on the one or more winning 3D game components that correspond to the one or more winning symbols.

5. The electronic gaming machine of claim 3, wherein the processor is configured to display the at least two selected sets of 3D game components in a distinguishing manner which visually distinguishes the at least two selected sets of 3D game components from the initial set of 3D game components.

6. The electronic gaming machine of claim 5, wherein the processor is configured to display the at least two selected sets of 3D game components in a distinguishing manner by:

determining a first set of visual characteristics associated with the initial set of 3D game components;

retrieving, from the persistent data store, a set of display rules;

determining, based on the set of display rules, a second set of visual characteristics; and displaying the at least two selected sets of 3D game components in accordance with the second set of visual characteristics.

7. The electronic gaming machine of claim 6, wherein the first or second set of visual characteristics comprise one or more of: shape, colour, depth level, spatial frequency, blackness level, brightness level, dynamic range, transfer function, duty cycle, and color gamut.

8. The electronic gaming machine of claim 3, wherein the processor is further configured to generate and display a new game as a result of the one or more winning 3D game components that correspond to the one or more winning symbols.

9. The electronic gaming machine of claim 3, wherein the signals indicating the at least two selected sets of 3D game components comprise at least one of user-input signals and machine-input signals.

10. An electronic gaming system for providing 3D selection game comprising:

a server comprising a transmitter for transmitting electronic data signals representing game data;

an electronic device comprising:

at least one processor;

at least one persistent data store;

at least one receiver to receive the electronic data signals representing game data for storage in the at least one persistent data store; and a display device configured with a user interface to display: 1) a multi-faceted gaming surface comprising at least two gaming surface representations; and 2) a portion of the game data as an initial set of 3D game components on the at least two gaming surface representations of a multi-faceted gaming surface in accordance with a set of game rules for a given game, each one of the 3D game components having a symbol associated thereto;

wherein the processor is configured to:

receive signals indicating at least two selected sets of 3D game components based on the initial set of 3D game components, each respective selected set of the at least two selected sets of 3D game components located on a respective one of the at least two gaming surface representations of the multi-faceted gaming surface;

display the at least two selected sets of 3D game components;

for each of the at least two gaming surface representations, determine a winning combination comprising one or more winning symbols; and display one or more winning 3D game components that correspond to the one or more winning symbols, wherein each of the at least two gaming surface representations of the multi-faceted gaming surface comprises at least two selection games and the processor is further configured to determine a winning combination for each of the at least two selection games of each of the at least two gaming surface representations.

11. The electronic gaming system of claim 10, wherein the multi-faceted gaming surface comprises at least four gaming surface representations, and each gaming surface representation comprises a face of the multi-faceted gaming surface.

12. The electronic gaming system of claim 10, wherein the at least two selection games on each of the at least two gaming surface representations is played based on the initial set of 3D game components and at least one of the at least two selected sets of 3D game components.

13. The electronic gaming system of claim 10, wherein the processor is configured to display the at least two selected sets of 3D game components in a distinguishing manner which visually distinguishes the at least two selected sets of 3D game components from the initial set of 3D game components.

14. The electronic gaming system of claim 10, wherein the processor is configured to display the at least two selected sets of 3D game components in a distinguishing manner by:

determining a first set of visual characteristics associated with the initial set of 3D game components;

retrieving, from the persistent data store, a set of display rules;

determining, based on the set of display rules, a second set of visual characteristics; and displaying the at least two selected sets of 3D game components in accordance with the second set of visual characteristics.

15. A computer-implemented method for providing 3D selection game components comprising:

receiving, by a processor, game data for storage in at least one persistent data store;

displaying, using a display device: 1) a multi-faceted gaming surface comprising at least two gaming surface representations; and 2) a portion of the game data as an initial set of 3D game components on the at least two gaming surface representations of a multi-faceted gaming surface in accordance with a set of game rules for a given game, each one of the 3D game components having a symbol associated thereto;

receiving signals, by the processor, indicating at least two selected sets of 3D game components based on the initial set of 3D game components, each respective selected set of the at least two selected sets of 3D game components located on a respective one of the at least two gaming surface representations of the multi-faceted gaming surface;

displaying, using a display device, the at least two selected sets of 3D game components;

determining for each of the at least two gaming surface representations, by the processor, a winning combination comprising one or more winning symbols; and displaying, using a display device, one or more winning 3D game components that correspond to the one or more winning symbols, wherein each of the at least two gaming surface representations of the multi-faceted gaming surface comprises at least two selection games and the processor is further configured to determine a winning combination for each of the at least two selection games of each of the at least two gaming surface representations.

16. The computer-implemented method of claim 15, wherein the multi-faceted gaming surface comprises at least four gaming surface representations, and each gaming surface representation comprises a face of the multi-faceted gaming surface.

17. The computer-implemented method of claim 15, wherein the at least two selection games on each of the at least two gaming surface representations is played based on the initial set of 3D game components and at least one of the at least two selected sets of 3D game components.

18. The computer-implemented method of claim 15, further displaying the at least two selected sets of 3D game components in a distinguishing manner which visually distinguishes the at least two selected sets of 3D game components from the initial set of 3D game components.

19. The computer-implemented method of claim 18, wherein displaying the at least two selected sets of 3D game components in a distinguishing manner comprises:

determining a first set of visual characteristics associated with the initial set of 3D game components;

retrieving, from the persistent data store, a set of display rules;

determining, based on the set of display rules, a second set of visual characteristics; and displaying the at least two selected sets of 3D game components in accordance with the second set of visual characteristics.

* * * * *